US012749817B2

(12) United States Patent
Chen et al.

(10) Patent No.: US 12,749,817 B2
(45) Date of Patent: Sep. 29, 2026

(54) FREQUENCY SELECTIVE SURFACE STRUCTURE

(71) Applicants: INVENTEC (PUDONG) TECHNOLOGY CORPORATION, Shanghai (CN); INVENTEC CORPORATION, Taipei City (TW)

(72) Inventors: Po-Han Chen, Taipei City (TW); Hao-Hsiang Wang, Taipei City (TW); Yu Shu Tai, Taipei City (TW); Hsin-Hung Lin, Taipei City (TW); Wei-Chen Cheng, Taipei City (TW)

(73) Assignees: INVENTEC (PUDONG) TECHNOLOGY CORPORATION, Shanghai (CN); INVENTEC CORPORATION, Taipei City (TW)

( * ) Notice: Subject to any disclaimer, the term of this patent is extended or adjusted under 35 U.S.C. 154(b) by 73 days.

(21) Appl. No.: 18/984,493

(22) Filed: Dec. 17, 2024

(65) Prior Publication Data

US 2026/0074431 A1 Mar. 12, 2026

(30) Foreign Application Priority Data

Sep. 10, 2024 (CN) ......................... 202411267934.1

(51) Int. Cl.
*H01Q 15/00* (2006.01)
*H01Q 9/04* (2006.01)

(52) U.S. Cl.
CPC ....... *H01Q 15/0013* (2013.01); *H01Q 9/0407* (2013.01)

(58) Field of Classification Search
CPC ............. H01Q 15/0013; H01Q 9/0407; H01Q 15/0026
See application file for complete search history.

(56) References Cited

U.S. PATENT DOCUMENTS 4,814,785 A * 3/1989 Wu .................... H01Q 15/0013 333/202
5,005,019 A * 4/1991 Zaghloul .............. H01Q 9/0414 166/270.1

(Continued)

FOREIGN PATENT DOCUMENTS

CN 111987439 A * 11/2020 ............. H01Q 1/427
CN 110931983 B * 4/2021 ......... H01Q 15/0013

(Continued)

OTHER PUBLICATIONS

Design of Dual-Band 2x2 MIMO Antenna System for 5G Wireless Terminals. (pp. 935-943, chap. 70) https://doi.org/10.1007/978-981-16-3246-4_71 by Narayan Krishan Vyas et al. (Year: 2021).*

*Primary Examiner* — Dameon E Levi
*Assistant Examiner* — Jose A. Miranda Gonzalez
(74) *Attorney, Agent, or Firm* — Maschoff Brennan

(57) ABSTRACT

The invention provides a frequency selective surface structure including a substrate and at least one conductive layer. The at least one conductive layer is disposed on the substrate and includes four central double-frequency patches. The four central double-frequency patches are spaced apart from one another and are arranged in a 2×2 array. In each of the four central double-frequency patches, the central double-frequency patch is in a polygonal shape and has a central corner part, a plurality of outer corner parts and a plurality of notches, the central corner part is located closer to a geometric center of the at least one conductive layer than the plurality of outer corner parts, and the plurality of notches are located on the plurality of outer corner parts, respectively.

9 Claims, 4 Drawing Sheets

(56) References Cited

U.S. PATENT DOCUMENTS

| | | | | | |
|---|---|---|---|---|---|
| 6,670,932 | B1 * | 12/2003 | Diaz | H01Q 15/008 343/909 |
| 7,071,889 | B2 * | 7/2006 | McKinzie, III | H01Q 5/357 343/756 |
| 7,639,206 | B2 * | 12/2009 | Behdad | H01Q 21/064 333/202 |
| 9,647,336 | B2 * | 5/2017 | Legay | H01Q 3/46 |
| 11,041,936 | B1 * | 6/2021 | Wall | G01S 7/023 |
| 11,545,758 | B2 * | 1/2023 | Koul | H01Q 15/0026 |
| 11,710,908 | B2 * | 7/2023 | Cao | H01Q 1/521 343/702 |
| 11,956,935 | B1 * | 4/2024 | Sechrist | G01R 29/0878 |
| 12,476,379 | B1 * | 11/2025 | Khushrushahi | H01Q 15/0026 |
| 2003/0112186 | A1 * | 6/2003 | Sanchez | H01Q 9/27 343/909 |
| 2004/0263420 | A1 * | 12/2004 | Werner | H01Q 1/38 343/909 |
| 2010/0284086 | A1 * | 11/2010 | Novack | H01Q 1/248 359/580 |
| 2015/0162663 | A1 * | 6/2015 | Boryssenko | H01Q 21/24 343/848 |
| 2023/0089687 | A1 * | 3/2023 | Kwon | H01Q 5/307 343/702 |

FOREIGN PATENT DOCUMENTS

| | | | | | |
|---|---|---|---|---|---|
| CN | 112838374 | A | * | 5/2021 | H01Q 15/0026 |
| CN | 114361810 | A | * | 4/2022 | |

* cited by examiner

FREQUENCY SELECTIVE SURFACE STRUCTURE

CROSS-REFERENCE TO RELATED APPLICATIONS

This non-provisional application claims priority under 35 U.S.C. § 119(a) on Patent Application No(s). 202411267934.1 filed in China, on Sep. 10, 2024, the entire contents of which are hereby incorporated by reference.

BACKGROUND OF THE INVENTION

Technical Field of the Invention

The invention relates to a frequency selective surface structure, more particularly to a frequency selective surface structure including central double-frequency patches.

Description of the Related Art

With the wide spread of the smartphone, new wireless technologies are continuously developed. Recently, 5th generation mobile networks (5G) has been widespread, and the 6th generation mobile networks (6G) has been preliminarily developed. Thus, the transition from 5G to 6G will be inevitable in the future. During such transition, a wireless communication apparatus is required to transmit and receive both of 5G signal and 6G signal of different bands.

However, conventional frequency selective surface can only pass signals of single band, and thus multiple frequency selective surface with different patterns should be used to pass both of 5G signal and 6G signal of different bands. That is, conventional frequency selective surface is unable to pass both of 5G signal and 6G signal.

SUMMARY OF THE INVENTION

The invention is to provide a frequency selective surface structure including four central double-frequency patches arranged in a 2×2 array to pass both of 5G signal and 6G signal.

One embodiment of this invention provides a frequency selective surface structure including a substrate and at least one conductive layer. The at least one conductive layer is disposed on the substrate and includes four central double-frequency patches. The four central double-frequency patches are spaced apart from one another and are arranged in a 2×2 array. In each of the four central double-frequency patches, the central double-frequency patch is in a polygonal shape and has a central corner part, a plurality of outer corner parts and a plurality of notches, the central corner part is located closer to a geometric center of the at least one conductive layer than the plurality of outer corner parts, and the plurality of notches are located on the plurality of outer corner parts, respectively.

According to the frequency selective surface structure disclosed by above embodiments, the four central double-frequency patches are spaced part from one another and are arranged in a 2×2 array, and each central double-frequency patch has the notches located on the outer corner parts. Thus, the frequency selective surface structure according to the invention is able to pass both of 5G signal and 6G signal. In this way, it is not required to use frequency selective surface structures of different patterns to pass 5G signal and 6G signal, which reduces the manufacture cost of the wireless communication apparatus applied during the transition from 5G to 6G.

BRIEF DESCRIPTION OF THE DRAWINGS

The present invention will become more fully understood from the detailed description given hereinbelow and the accompanying drawings which are given by way of illustration only and thus are not limitative of the present invention and wherein.

DETAILED DESCRIPTION

Figure 1:
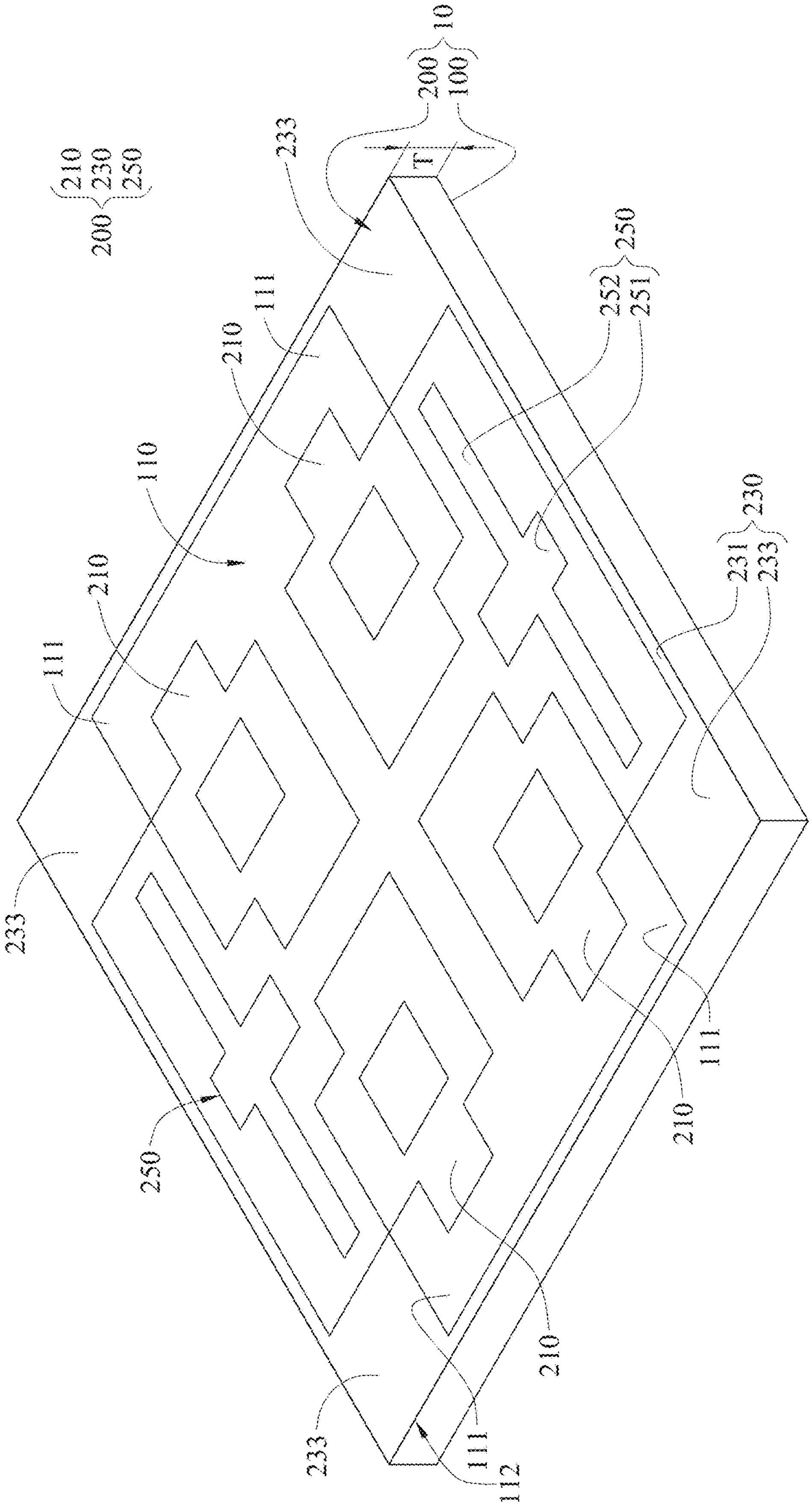
FIG. 1 is a perspective view of a frequency selective surface structure according to a first embodiment of the invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
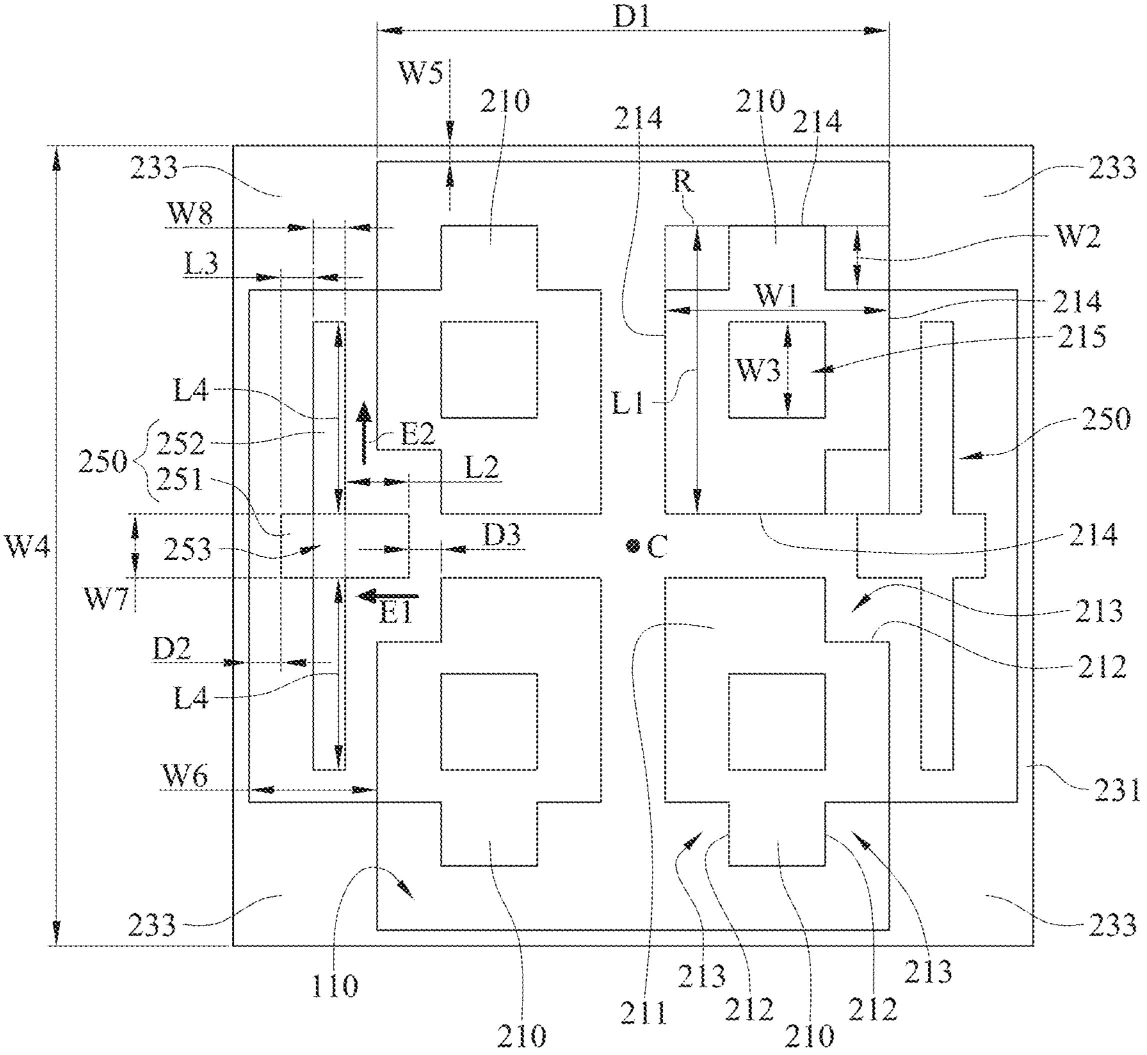
FIG. 2 is a top view of the frequency selective surface structure in FIG. 1.

Please refer to FIGS. 1 and 2. FIG. 1 is a perspective view of a frequency selective surface structure 10 according to a first embodiment of the invention. FIG. 2 is a top view of the frequency selective surface structure 10 in FIG. 1.

In this embodiment, the frequency selective surface structure 10 includes a substrate 100 and a conductive layer 200. The substrate 100 is made of, for example, a composite material meeting the FR4. The substrate 100 has an outer surface 110. A thickness T of the substrate 100 is, for example, 0.4 millimeter (mm). The outer surface 110 is in a polygonal shape, such as a rectangular shape. The outer surface 110 has a plurality of substrate corner parts 111. The conductive layer 200 is made of a metal material, such as copper. The conductive layer 200 is disposed on the outer surface 110 of the substrate 100, and includes, for example, four central double-frequency patches 210, a high-frequency patch 230 and two low-frequency patches 250. The conductive layer 200 is, for example, a symmetric structure.

The four central double-frequency patches 210 are spaced apart from one another, and are arranged in a 2×2 array. The four central double-frequency patches 210 are similar in structure, and thus only the detailed structure of one central double-frequency patch 210 will be exemplarily described hereinafter. The central double-frequency patch 210 is in a polygonal shape, and has a central corner part 211, a plurality of outer corner parts 212 and a plurality of notches 213. The central corner part 211 is located closer to a geometric center C of the conductive layer 200 than the outer corner parts 212. The notches 213 are located on the outer corner parts 212, respectively.

In this embodiment, there are three outer corner parts 212 and three notches 213. The central double-frequency patch 210 further has four outer edges 214. The extension lines of the four outer edges 214 intersect with one another and together form an outer peripheral region R that is in a rectangular shape.

In addition, in this embodiment, for example, the notches 213 are in a rectangular shape, such as a square shape. For example, a length L1 and a width W1 of the outer peripheral region R are 4.5 mm and 3.5 mm, respectively. Also, a width W2 of the notches 213 is, for example, 1 mm.

Moreover, in this embodiment, the central double-frequency patch 210 further has a slot 215. The slot 215 is spaced apart from the central corner part 211 and the outer corner parts 212. For example, the slot 215 is in a rectangular shape, such as a square shape. Also, a width W3 of the slot 215 is, for example, 1.5 mm.

The high-frequency patch 230 includes a peripheral part 231 and a plurality of protruding parts 233. The protruding parts 233 protrude inwards from the peripheral part 231. For example, the peripheral part 231 is in a rectangular shape, such as a square shape. In addition, the peripheral part 231 is in, for example, a hollow shape. The peripheral part 231 is located on an outer edge 112 of the outer surface 110, and surrounds the protruding parts 233 and the central double-frequency patches 210. The protruding parts 233 are located on the substrate corner parts 111, respectively.

Additionally, in this embodiment, an outer width W4 of the peripheral part 231 is, for example, 12.5 mm. An inner width W5 of the peripheral part 231 is, for example, 0.25 mm. Also, in this embodiment, for example, the protruding parts 233 are in a rectangular shape, such as a square shape. A width W6 of the protruding parts 233 is, for example, 2 mm. Further, in this embodiment, a distance D1 between adjacent two protruding parts 233 is, for example, 8 mm.

The two low-frequency patches 250 are spaced apart from the four central double-frequency patches 210 and the high-frequency patch 230. The two low-frequency patches 250 are similar in structure, and thus only the detailed structure of one low-frequency patch 250 will be exemplarily described hereinafter. The low-frequency patch 250 includes a first frequency selective bar 251 and a second frequency selective bar 252 that are partially overlapped in an overlapped region 253. An extension direction E1 of the first frequency selective bar 251 is perpendicular to an extension direction E2 of the second frequency selective bar 252, such that the low-frequency patch 250 is roughly in a cross shape. A width W7 (e.g., 1 mm) of the first frequency selective bar 251 is larger than a width W8 (e.g., 0.5 mm) of the second frequency selective bar 252. The central double-frequency patches 210 are located between two second frequency selective bars 252 of the two low-frequency patches 250. Also, a part of the first frequency selective bar 251 is located between adjacent two central double-frequency patches 210.

In addition, in this embodiment, a length L2 (e.g., 1 mm) by which the first frequency selective bar 251 protrudes toward the geometric center C of the conductive layer 200 from the overlapped region 253 is longer than a length L3 by which the first frequency selective bar 251 protrudes away from the geometric center C of the conductive layer 200 from the overlapped region 253.

Also, a length L4 by which the second frequency selective bar 252 protrudes from the overlapped region 253 is, for example, 3 mm.

Additionally, a distance D2 between the first frequency selective bar 251 and the peripheral part 231 is, for example, longer than 0.5 mm. A distance D3 between the first frequency selective bar 251 and the central double-frequency patch 210 adjacent thereto is, for example, 0.5 mm.

The four central double-frequency patches 210 are spaced part from one another and are arranged in a 2×2 array, and each central double-frequency patch 210 has the notches 213 located on the outer corner parts 212. Thus, the frequency selective surface structure 10 according to the invention is able to pass both of 5G signal and 6G signal. In this way, it is not required to use frequency selective surface structures of different patterns to pass 5G signal and 6G signal, which reduces the manufacture cost of the wireless communication apparatus applied during the transition from 5G to 6G.

For example, the frequency selective surface structure 10 of the first embodiment is able to pass both of 5G signal in a band ranging from 3.17 GHz to 5.11 GHz (n78 and n79 bands) and 6G signal in a band ranging from 11.75 GHz to 18.78 GHz (Ku and Ka bands).

In addition, with the high-frequency patch 230, the width of the low frequency passband related to 5G is widened and the filtering effect thereof is enhanced, while widening the width of high frequency passband related to 6G.

Furthermore, with the two low-frequency patches 250, the width of the low frequency passband related to 5G is widened.

Note that in other embodiments, if the demand for the width of the low frequency passband related to 5G and the width of the high frequency passband related to 6G is low, the frequency selective surface structure may not include the high-frequency patch 230 and the low-frequency patches 250.

Other embodiments are described below for illustrative purposes. It is to be noted that the following embodiments use the reference numerals and a part of the contents of the above embodiments, the same reference numerals are used to denote the same or similar elements, and the description of the same technical contents is omitted. For the description of the omitted part, reference may be made to the above embodiments, and details are not described in the following embodiments.

Figure 3:
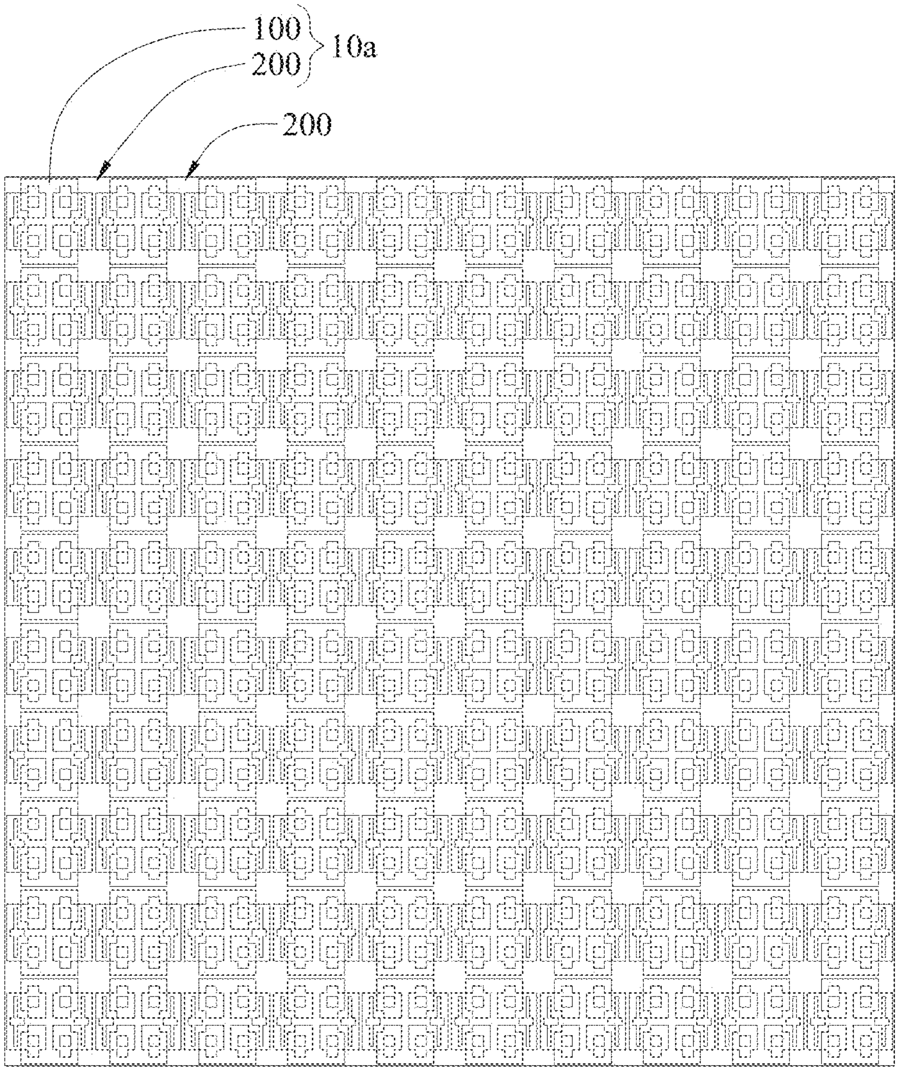
FIG. 3 is a top view of a frequency selective surface structure according to a second embodiment of the invention.

The invention is not limited by the number of the conductive layer. Please refer to FIG. 3 that is a top view of a frequency selective surface structure 10*a* according to a second embodiment of the invention. In this embodiment, the frequency selective surface structure 10*a* includes a plurality of conductive layers 200 that are arranged in a 10×10 array on the substrate 100.

Figure 4:
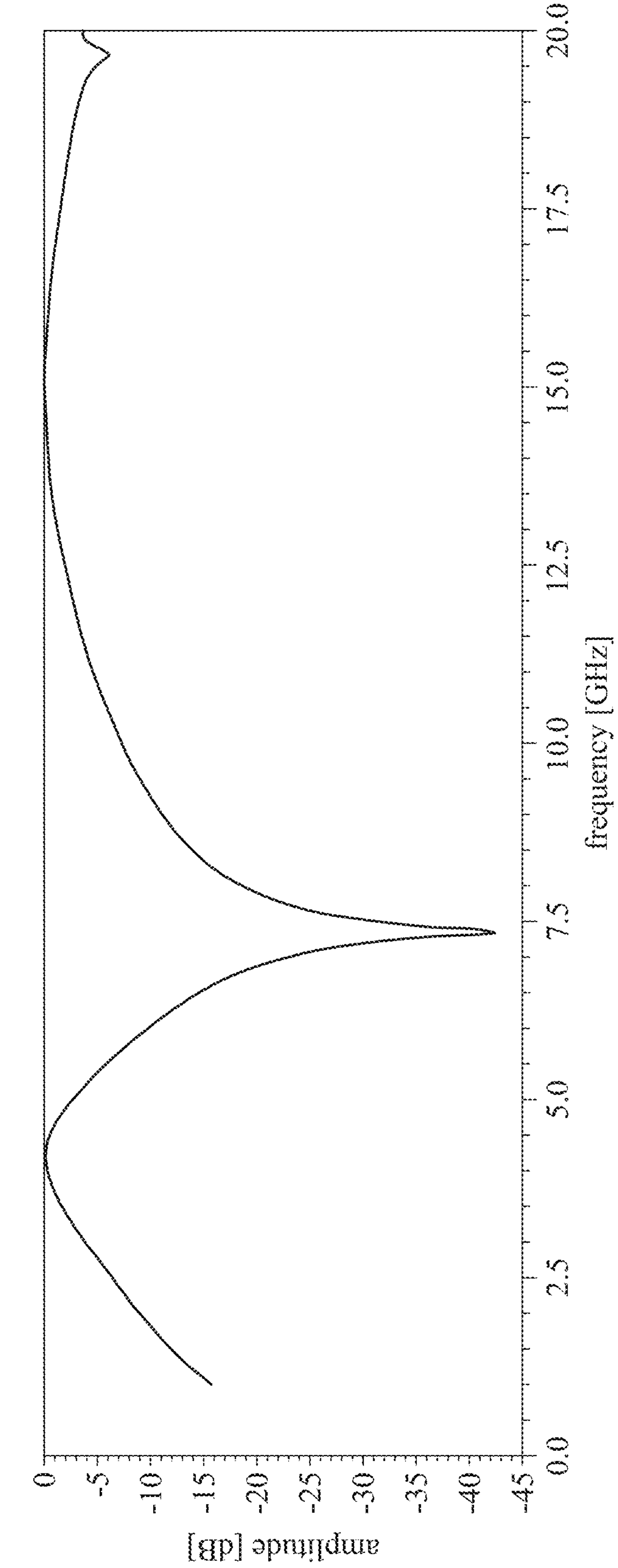
FIG. 4 is a graph showing the return loss of an antenna cooperating with the frequency selective surface structure according to the invention.

Please refer to FIG. 4 that is a graph showing the return loss of an antenna (not shown) cooperating with the frequency selective surface structure 10 or 10*a* according to the invention. The graph in FIG. 4 shows the return loss of the antenna cooperating with the frequency selective surface structure 10 of the first embodiment or the frequency selective surface structure 10*a* of the second embodiment. As shown in FIG. 4, the frequency selective surface structure 10 or the frequency selective surface structure 10*a* makes the return loss to be nearly 0 in the band ranging from 3.17 GHz to 5.11 GHz (5G band) and the band ranging from 11.75 GHz to 18.78 GHz (6G band), and the return loss in the bands of other frequencies obvious have higher return loss. That is, the frequency selective surface structure 10 or the frequency selective surface structure 10*a* passes the signal in the band ranging from 3.17 GHz to 5.11 GHz (5G band) and the band ranging from 11.75 GHz to 18.78 GHz (6G band) in a desired manner. Thus, almost no signal attenuation is generated in the aforementioned bands, while a significant signal attenuation (i.e., attenuation of noise) is generated in the bands of other frequencies.

According to the frequency selective surface structure disclosed by above embodiments, the four central double-frequency patches are spaced part from one another and are arranged in a 2×2 array, and each central double-frequency patch has the notches located on the outer corner parts. Thus, the frequency selective surface structure according to the invention is able to pass both of 5G signal and 6G signal. In this way, it is not required to use frequency selective surface structures of different patterns to pass 5G signal and 6G signal, which reduces the manufacture cost of the wireless communication apparatus applied during the transition from 5G to 6G.

It will be apparent to those skilled in the art that various modifications and variations can be made to the present invention. It is intended that the specification and examples be considered as exemplary embodiments only, with a scope of the invention being indicated by the following claims and their equivalents.

What is claimed is:

1. A frequency selective surface structure, comprising:

a substrate; and at least one conductive layer, disposed on the substrate and comprising four central double-frequency patches, wherein the four central double-frequency patches are spaced apart from one another and are arranged in a 2×2 array;

wherein, in each of the four central double-frequency patches, the central double-frequency patch is in a polygonal shape and has a central corner part, a plurality of outer corner parts and a plurality of notches, the central corner part is located closer to a geometric center of the at least one conductive layer than the plurality of outer corner parts, and the plurality of notches are located on the plurality of outer corner parts, respectively;

wherein the at least one conductive layer further comprises a high-frequency patch, the substrate has an outer surface, the at least one conductive layer is disposed on the outer surface, the outer surface is in a polygonal shape and has a plurality of substrate corner parts, the high-frequency patch comprises a peripheral part and a plurality of protruding parts, the plurality of protruding parts protrude inwards from the peripheral part, the peripheral part is located on an outer edge of the outer surface and surrounds the plurality of protruding parts and the four central double-frequency patches, and the plurality of protruding parts are located on the plurality of substrate corner parts, respectively.

2. The frequency selective surface structure according to claim 1, wherein in each of the four central double-frequency patches, the plurality of outer corner parts comprises three outer corner parts and the plurality of notches comprises three notches, the central double-frequency patch further has four outer edges, and extension lines of the four outer edges intersect with one another and together form an outer peripheral region that is in a rectangular shape.

3. The frequency selective surface structure according to claim 2, wherein in each of the four central double-frequency patches, the plurality of notches are in a square shape, a length and a width of the outer peripheral region are 4.5 millimeter (mm) and 3.5 mm, respectively, and a width of the plurality of notches is 1 mm.

4. The frequency selective surface structure according to claim 1, wherein in each of the four central double-frequency patches, the central double-frequency patch further has a slot that is spaced apart from the central corner part and the plurality of outer corner parts.

5. The frequency selective surface structure according to claim 4, wherein the slot of each of the four central double-frequency patches is in a square shape.

6. The frequency selective surface structure according to claim 1, wherein the at least one conductive layer further comprises two low-frequency patches, the two low-frequency patches are spaced apart from the four central double-frequency patches and the high-frequency patch, in each of the two low-frequency patches, the low-frequency patch comprises a first frequency selective bar and a second frequency selective bar that are partially overlapped in an overlapped region, an extension direction of the first frequency selective bar is perpendicular to an extension direction of the second frequency selective bar, a width of the first frequency selective bar is larger than a width of the second frequency selective bar, and the four central double-frequency patches are located between the two second frequency selective bars of the two low-frequency patches.

7. The frequency selective surface structure according to claim 6, wherein in each of the two low-frequency patches, a length by which the first frequency selective bar protrudes toward the geometric center of the at least one conductive layer from the overlapped region is longer than a length by which the first frequency selective bar protrudes away from the geometric center of the at least one conductive layer from the overlapped region.

8. The frequency selective surface structure according to claim 6, wherein in each of the two low-frequency patches, a part of the first frequency selective bar is located between two adjacent ones of the four central double-frequency patches.

9. The frequency selective surface structure according to claim 1, wherein the at least one conductive layer comprises a plurality of conductive layers that are arranged in a 10×10 array on the substrate.

* * * * *